United States Patent [19]

Koch

[11] 4,168,855
[45] Sep. 25, 1979

[54] VEHICLE PROTECTION BUMPER ASSEMBLY

[76] Inventor: Kevin E. Koch, 47 Kinkaid Ave., North Plympton, South Australia, Australia

[21] Appl. No.: 879,468

[22] Filed: Feb. 21, 1978

[30] Foreign Application Priority Data

Jun. 10, 1977 [AU] Australia .............................. 72056/77

[51] Int. Cl.² .............................................. B60R 19/00
[52] U.S. Cl. .................................... 293/115; 293/142; 293/146; 293/155; 403/227
[58] Field of Search ...................................... 293/64–67, 293/70, 60, 71 R, 63, 71 P, 80–82, 88, 90, 97, 98, 99–101, 115, 142–145, 146–148, 155, 102; 403/389, 405, 390, 391, 227, 225, 226; 180/68 P

[56] References Cited

U.S. PATENT DOCUMENTS

| | | | |
|---|---|---|---|
| 1,739,236 | 12/1929 | Jandus | 293/88 |
| 1,783,335 | 12/1930 | Laher | 293/88 |
| 3,438,667 | 4/1969 | Davis | 293/100 X |

FOREIGN PATENT DOCUMENTS

| | | | |
|---|---|---|---|
| 1271369 | 7/1961 | France | 293/97 |
| 530341 | 12/1940 | United Kingdom | 403/391 |

*Primary Examiner*—Douglas C. Butler
*Attorney, Agent, or Firm*—Norbert P. Holler

[57] ABSTRACT

A light-weight resilient vehicle protection bumper assembly comprising resilient bumper bars clamped to a vehicle chassis which extend across the width of the vehicle at its front end (in some cases also at its rear end), the bumper bars being formed from transparent polycarbonate tubing, mounted in rubber.

7 Claims, 7 Drawing Figures

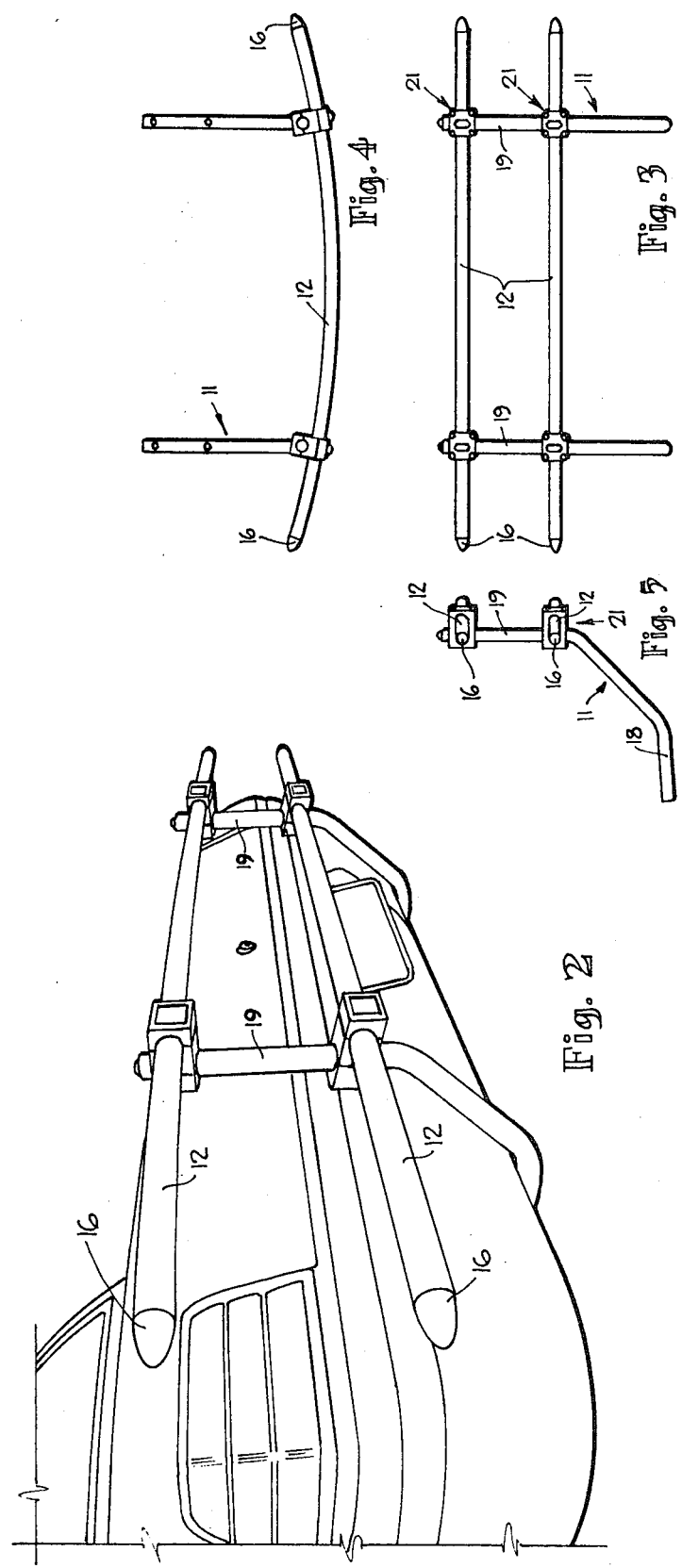

VEHICLE PROTECTION BUMPER ASSEMBLY

This invention relates to a vehicle protection bumper assembly which is useful for protecting a vehicle against relatively light impact loading, for example, such as may be encountered in speeds up to but not exceeding 45 kph, and loads up to but not exceeding 100 kg.

BACKGROUND OF THE INVENTION

Vehicles are normally provided with bumper bars which function efficiently for protecting the vehicles from damage in many instances, but there are many instances where damage occurs notwithstanding use of bumper bars, for example if the vehicle runs into an animal, or if a vehicle is damaged during parking. This need has been recognised heretofore, and it is known to mount heavy steel tubes on spaced support bars for protecting a vehicle against damage due to animals.

The prior art devices however are subject to a number of disabilities, one being that the excessive weight is most undesirable at one end of the vehicle, particularly the front end, since the vehicle loses much of its balance and safety standards are impaired. Steering can be rendered more difficult or unpredictable, and the steel tubes can and frequently do interfere with clear vision of lighting equipment and turn indicators.

The main object of this invention is to provide a relatively light weight and resilient vehicle protection bumper assembly which will perform some at least of the functions of reducing damage to a vehicle in the case of impact and reducing likelihood of damage to other vehicles when parking.

BRIEF SUMMARY OF THE INVENTION

Briefly in this invention there are provided resilient bumper bars clamped to bumper carrier portions of support bars which are themselves secured to vehicle chassis members, and the arrangement is such that the bumper bars extend across the width of the vehicle at one end. In most instances the device is used at the front end of the vehicle to project forwardly of the vehicle, but in some instances it can be utilised at the rear end of the vehicle.

Resilience is a matter of considerable importance, and to achieve the required lower weight, in another aspect of the invention use is made of tubes formed from polycarbonate having a modulus elasticity exceeding 290,000 lbs per square inch. Such material is light in weight, is transparent, and is resilient. However, it is subject to the disability that if clamped by rigid clamps, the tube develops stress concentration points, and in a further aspect of the invention use is made of clamps to clamp the bumper bars to the support bars, which comprise rubber blocks in tandem which clamp the bumper bars and support bars, the rubber blocks reducing the tendency for formation of stress concentration points. However, even when rubber blocks are used for clamping polycarbonate tube difficulties can be encountered if the pressure applied is too high, and in a still further aspect of this invention there are provided limit tubes which extend through the clamping blocks and which surround the clamping bolts, the limit tubes being effective in reducing the interference between the rubber blocks and the tubes to not exceed 4% of the tube diameter, that is a 35 mm diameter tube extends through an aperture, which, upon assembly of the rubber blocks and clamping thereof with the clamping bolts, provides an interference which does not exceed 1.4 mm. Preferably the interference is about 2.5% of the tube diameter, since such interference will not under ordinary conditions cause stress conditions to be set up to such an extent that the tube is liable to serious damage.

More specifically, in one aspect, the invention consists of a vehicle protection bumper assembly comprising a pair of spaced support bars, each support bar having a clamping portion providing means for clamping that said support bar to a vehicle, each support bar also having an upstanding bumper carrier portion, at least two transversely extending bumper bars of resilient material, and a plurality of clamps clamping each bumper bar to the upstanding bumper carrier portions of said support bars, each said clamp comprising elastomeric material which engages the said bumper bar, the shape and dimensions of said support bars and bumper bars being such, that, when said support bars are clamped to vehicle chassis members at one end of the vehicle, the bumper bars extend across the width of the vehicle at said vehicle end.

BRIEF DESCRIPTION OF THE DRAWINGS

An embodiment of the invention is described hereunder in some detail with reference to and as illustrated in the accompanying drawings in which:

FIG. 2 is a perspective view showing a vehicle protection bumper assembly mounted at the rear end of the vehicle, FIG. 3 is a front elevation of the assembly, FIG. 4 is a plan of same, FIG. 5 is an end elevation of same.

Referring first to FIG. 1, a vehicle 10 is partly shown to have a pair of support bars 11 extending forwardly of the front end of the vehicle, the support bars 11 having on them bumper bars 12. In FIG. 2 the same arrangement is shown at the rear end of a vehicle 14. Each bumper bar 12 is formed from polycarbonate, being a material having a modulus elasticity exceeding 290,000 lb per square inch, and an ultimate tensile strength exceeding 1000 lbs. per square inch. Each bumper bar 12 is in the form of a tube, and the tube ends are closed with caps designated 16. The tubes and caps are all of transparent material so that there is very little interference with the vision of turning indicators, head lights or other illuminated parts of the vehicle.

Figure 1:
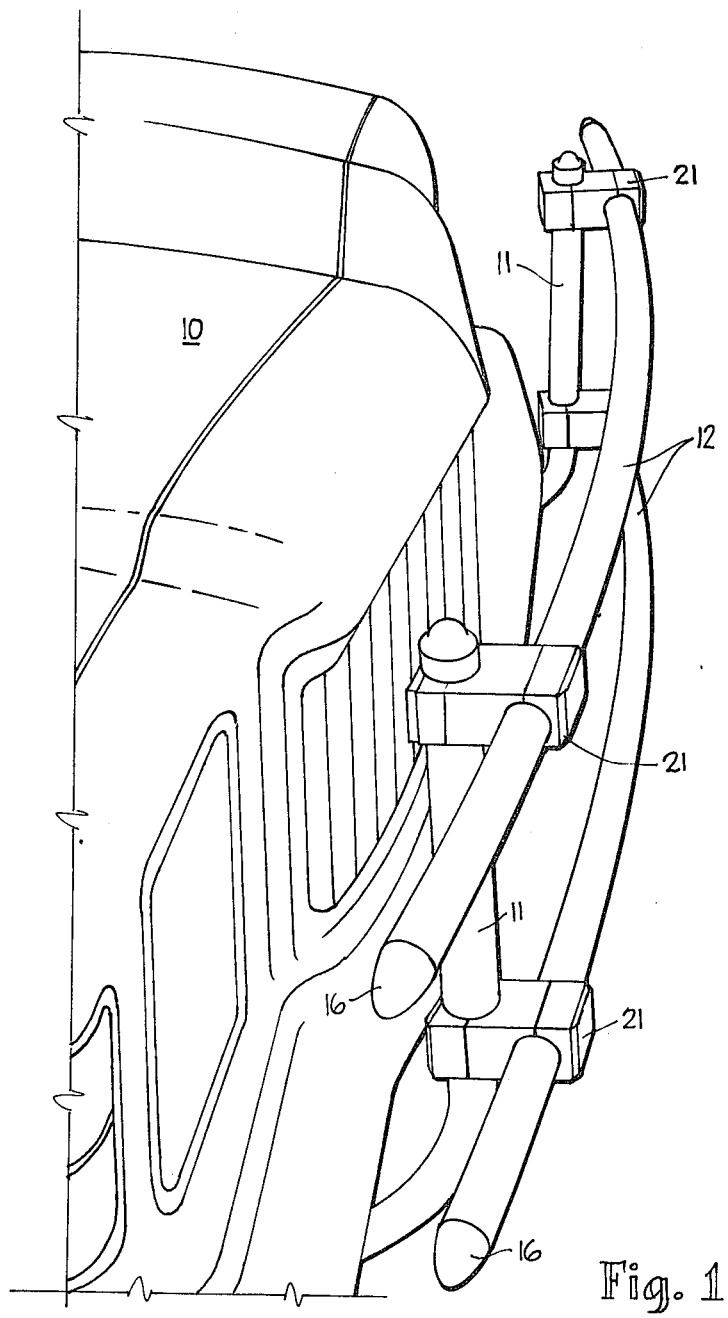
FIG. 1 is a perspective view showing a vehicle protecting bumper assembly mounted at the front end of a vehicle.

Reference is now made to the assembly as illustrated in FIGS. 3, 4 and 5. Each support bar 11 is a steel tube provided with clamping ends designated 18 and a bumper carrier portion 19 to which the bumpers 12 are clamped. The clamp end 18 is secured to the chassis portions of a vehicle in a manner which varies widely with different vehicles, but nevertheless forms part of known art. For this reason the clamping member is not separately illustrated, but it should be noted that it can be in the form of U-bolts, bolts passing through the clamping ends, or can be plate-like clamps.

Figure 6:
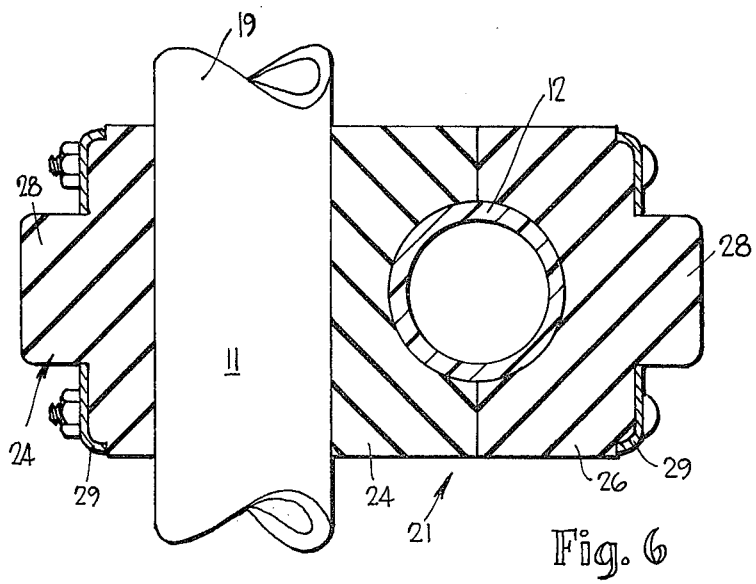
FIG. 6 is a central section taken through the clamp assembly showing the manner in which a bumper bar is clamped to a support bar.
Figure 7:
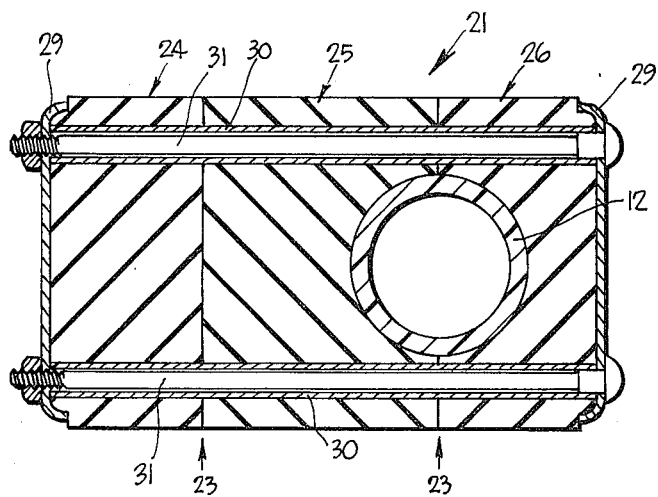
FIG. 7 is a section taken on the plane parallel to that illustrated in FIG. 6 and showing a limit pin arrangement around clamping bolts.

Each clamping assembly is generally designated 21, and as shown in detail in FIGS. 6 and 7, comprises three rubber blocks in tandem, the rubber blocks lying in a face to face relationship so as to form two separation planes designated 23. The rearmost clamp rubber block is designated 24, the intermediate block 25 and the outermost or forward block 26. Each of the two separation planes 23 are each co-incident with diametral planes of the circular walls forming restrictive clamping apertures which clamp over the bumper bars and support bars. The two outer blocks of the assembly have on them non-circular bosses designated 28 and these locate and protrude through end plates 29, and the end plates 29 themselves slide over respective limit tubes 30. Bolts 31 extend through the limit tubes 30 and abut the plates 29 at their ends, or alternatively, terminate a short distance in from the end plates 29. The arrangement is such that upon clamping there is an interference around both the support bars and bumper bars by the walls of two "hole halves" which are drawn towards one another as the nuts are tightened on the bolts 31. However the limit tubes function to limit inward movement of the end plates 29 towards one another, thereby preventing crushing of the relatively light polycarbonate tube.

The rubber selected in this embodiment is SBR (styrene butadiene rubber) and has a hardness of 90 to 95 Shore A, an elongation of 360% and a tensile strength of 1900 lbs. per square inch. With such rubber, an interference of 2.5% of diameter, (that is the free diameter of the aperture is 2.5% less than the diameter of the tube), and it is found with this degree of interference the polycarbonate tubes are firmly clamped but there is very little development of stress due to the clamping.

Surprisingly it has been found that a bumper assembly using two bumper bars is capable of being driven at 40 kph. into a suspended weight of 100 kg. without destroying the bumper bars. This is particularly useful in limiting damage to a motor vehicle, and since the device extends across the front end of the vehicle, and in some instances also extends across the rear of the vehicle, driving is greatly facilitated when a vehicle is to be moved into a tight parking area, in that the limits of the vehicle are clearly visable to the driver, and interference with an adjacent vehicle is less likely to damage that vehicle.

Various modifications in the structure and function of the embodiments disclosed herein may be made by one skilled in the art without departing from the scope of the invention as defined by the claims.

I claim:

1. A vehicle protection bumper assembly comprising at least two spaced support bars, each support bar having a clamping portion means for clamping said support bar to a vehicle, said support bar also having an upstanding bumper carrier portion, at least two transversely extending bumper bars of resilient material, each said bumper bar being a polycarbonate tube having a modulus of elasticity exceeding 290,000 pounds per square inch, and a plurality of clamps clamping each bumper bar to the upstanding bumper carrier portions of said support bars, each said clamp comprising an assembly of three rubber blocks in tandem and lying in face to face relationship so as to form two separation planes, each separation plane being a diametral plane of circular walls defining a clamping aperture in which said upstanding bumper carrier portion and a said bumper bar is respectively located, end plates on the assembly, and clamping bolts extending through said rubber blocks and end plates and clamping said bumper carrier portion and bumper bar, the shape and dimensions of said support bars and bumper bars being such that, when said support bars are clamped to the vehicle at one end of the vehicle the bumper bars extend across the width of the vehicle at said vehicle end.

2. A vehicle protection bumper assembly according to claim 1 wherein each said support bar is a steel tube.

3. A vehicle protection bumper assembly according to claim 1 further comprising limit tubes around respective said clamping bolts, extending through said rubber blocks and limiting clamping movement of said end plates.

4. A vehicle protection bumper assembly according to claim 1 further comprising limit means limiting clamping movement of the end plates such that interference between the clamping aperture walls of each said clamping aperture and the bar clamped thereby is less than four percent (4%).

5. A vehicle protection bumper assembly according to claim 1 wherein the clamping apertures are transverse to each other.

6. A vehicle protection bumper assembly according to claim 1 wherein the tubes are transparent.

7. A vehicle protection bumper assembly according to claim 1 wherein the tubes have ends which are closed with caps of the same material as the tubes.

* * * * *